United States Patent [19]
Brown

[11] Patent Number: 6,161,666
[45] Date of Patent: Dec. 19, 2000

[54] CLUTCH AND BRAKE CONTROL SYSTEM AND METHOD FOR A STANDARD TRANSMISSION VEHICLE

[76] Inventor: Ramon Louis Brown, 10306 NE. 22$^{nd}$ St., Vancouver, Wash. 98664

[21] Appl. No.: 09/346,600

[22] Filed: Jul. 2, 1999

[51] Int. Cl.$^7$ .................................................. B61K 41/24
[52] U.S. Cl. ..................... 192/13 R; 192/83; 192/3.63; 74/479.11
[58] Field of Search ................................ 192/12 R, 13 R, 192/13 A, 83, 3.63, 18 R, 18 A, 12 C; 74/471 R, 473.17, 478, 479.01, 480 R, 490.11, 512, 490.15

[56] References Cited

U.S. PATENT DOCUMENTS

| | | | |
|---|---|---|---|
| 1,930,710 | 10/1933 | Dodge et al. | 192/13 R |
| 1,973,826 | 9/1934 | Schweering | 192/13 R |
| 3,124,970 | 3/1964 | Walker | 192/13 R X |
| 3,529,701 | 9/1970 | Gethmann et al. | 192/13 R X |
| 3,586,920 | 6/1971 | Wakamatsu | 192/13 R X |
| 3,655,018 | 4/1972 | Higuchi et al. | 192/13 R X |
| 3,815,713 | 6/1974 | Dietrich | 192/13 R X |
| 4,014,419 | 3/1977 | McKnight | 192/13 R |
| 4,732,248 | 3/1988 | Yoshimura et al. | 192/13 R X |
| 4,825,989 | 5/1989 | Frigger | 192/13 R |
| 5,058,717 | 10/1991 | Haglund | 192/12 R |
| 5,833,210 | 11/1998 | Sommer | 251/61.4 |

*Primary Examiner*—Charles A Marmor
*Assistant Examiner*—Ankur Parekh
*Attorney, Agent, or Firm*—Klarquist Sparkman Campbell Leigh & Whinston, LLP

[57] ABSTRACT

A clutch and brake control system that allows a clutch in a standard transmission vehicle, such as a concrete truck or dump truck, to be controlled by pressing and releasing of the brake pedal. The brake pedal is coupled to the vehicle clutch so that pressing on the brake disengages the clutch and releasing the brake engages the clutch. By coupling the brake pedal to the clutch, the driver can use a single foot pedal to control the movement of the vehicle. This frees the driver from leg strain caused by constant pressing and releasing of the clutch pedal while dumping materials that the vehicle contains. The coupling of the brake to the clutch may be activated when the standard transmission vehicle is in a special low gear designed for dumping the vehicle load. This is an optional safety feature that exists in the vehicle to ensure that the clutch and brake pedal are not coupled together while the vehicle is traveling at high speeds. Additionally, both the clutch and brake pedals are coupled to the clutch, yet each controls the clutch independently and does not effect the operation of the other pedal. For example, the driver can release the brake pedal to engage the clutch without effecting the clutch pedal whatsoever. Similarly, the clutch pedal can be pressed to disengage the clutch and such action has no effect on the operation of the brake pedal.

33 Claims, 3 Drawing Sheets

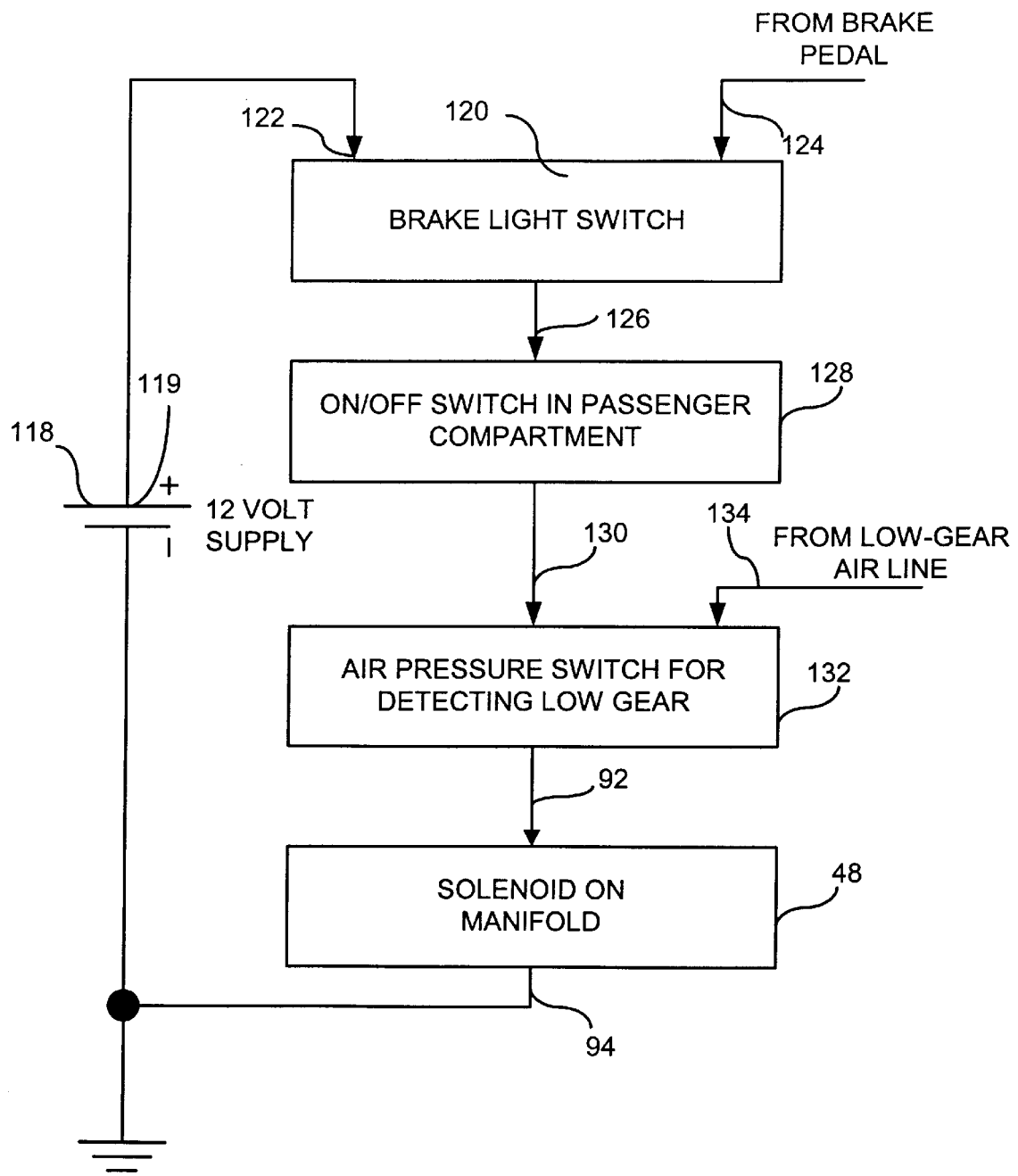

CLUTCH AND BRAKE CONTROL SYSTEM AND METHOD FOR A STANDARD TRANSMISSION VEHICLE

FIELD OF THE INVENTION

The present invention concerns vehicles having a standard transmission, and more particularly concerns trucks, such as concrete trucks and dump trucks, having a combined clutch and brake system which facilitates loading and unloading of material.

BACKGROUND OF THE INVENTION

Concrete trucks or transit mixers are well known in the construction industry and generally include a mixing drum mounted on a vehicle for mixing and delivering a batch of concrete. Raw materials, such as cement, aggregate and sand are loaded into the mixing drum at a batching plant. During the transportation of the materials to the job site, the mixing of the raw materials and/or concrete is continued by rotation of the mixing drum until the concrete is ready to pour.

The concrete may be used for a number of applications, such as pouring a curb, driveway, foundation, etc. Typically, to pour the concrete for such structures, the driver of the truck slowly moves the truck forwards or backwards as workers behind the truck guide or shovel the concrete into an appropriate form. Most concrete trucks are standard transmission vehicles, meaning they have a clutch controlled by a foot pedal and a stick shift which allows the driver to change gears. In order for the concrete truck to move forwards or backwards slowly, the driver must constantly engage and disengage the clutch with one foot, while the other foot is used to press and release the brake.

Pressing a clutch pedal in a truck is more difficult than a standard transmission automobile. For example, typical trucks require 60 pounds of pressure to press the clutch pedal. In a typical job, the driver of the concrete truck presses the clutch pedal approximately every three to five seconds to maintain proper speed while pouring the concrete. Moreover, dropping a single load of concrete can take two hours, causing the driver to press and release the clutch hundreds of times a day. After many years of driving concrete trucks, drivers are experiencing medical problems with their clutch legs due to the constant strain of pressing and releasing the clutch pedal.

Other standard transmission trucks have similar problems. For example, dump trucks often require loading loads slowly while moving forward. Drivers of such trucks also experience strain on their clutch leg, which may lead to medical problems.

It is desirable, therefore, to provide a standard transmission vehicle that simplifies the task of unloading and loading material at a job site and relieves the strain caused by use of a vehicle clutch pedal.

SUMMARY OF THE INVENTION

The present invention provides a combined clutch and brake mechanism that allows the driver of a standard transmission vehicle to press a single pedal (i.e., the brake pedal) to slowly move the vehicle forwards or backwards. The invention is particularly beneficial for use in standard transmission trucks, such as concrete mixers and dump trucks, to slowly move the truck for dumping and loading the truck's load.

In one aspect of the invention, a brake pedal is coupled to the vehicle clutch so that pressing on the brake disengages the clutch and releasing the brake engages the clutch. By coupling the brake pedal to the clutch, the driver can use a single foot pedal to control the movement of the vehicle. This frees the driver from leg strain caused by constant pressing and releasing of the clutch pedal.

In another aspect of the invention, the coupling of the brake to the clutch is only activated when the standard transmission vehicle is in a special low gear designed for dumping the vehicle load. This is an optional safety feature that exists in the vehicle to ensure that the clutch and brake pedal are coupled together only when desired. Thus, the clutch and brake pedal can operate independently of each other when the vehicle is traveling on a roadway.

In yet another aspect of the invention, both the clutch and brake pedals are coupled to the clutch, yet each controls the clutch independently and does not affect the operation of the other pedal. For example, the driver can release the brake pedal to engage the clutch without affecting the clutch pedal whatsoever. Similarly, the clutch pedal can be pressed to disengage the clutch and such action has no affect on the operation of the brake pedal. However, for either pedal, disengaging the clutch has priority over engaging the clutch. Thus, if either one of the pedals is used to disengage the clutch, the clutch is disengaged, despite the other pedal being in position to engage the clutch.

In still a further aspect of the invention, a piston that extends and retracts in response to the flow of fluid is used to engage and disengage the clutch in response to movement of the brake pedal. In particular, when the brake is pressed, a signal is sent to a solenoid that controls fluid flowing through a manifold. Fluid flow to the piston extends the piston to disengage the clutch. When the brake pedal is released, the solenoid again controls the manifold to change the direction of the fluid flow. As a result, the piston is retracted and the clutch is engaged.

These features and others of the present invention will be more readily apparent from the following detailed description of an exemplary embodiment which proceeds with reference to the accompanying drawings.

BRIEF DESCRIPTION OF THE DRAWINGS

FIG. 6 shows an electrical diagram for the clutch and brake control system according to one embodiment of the invention.

DETAILED DESCRIPTION

Figure 1:
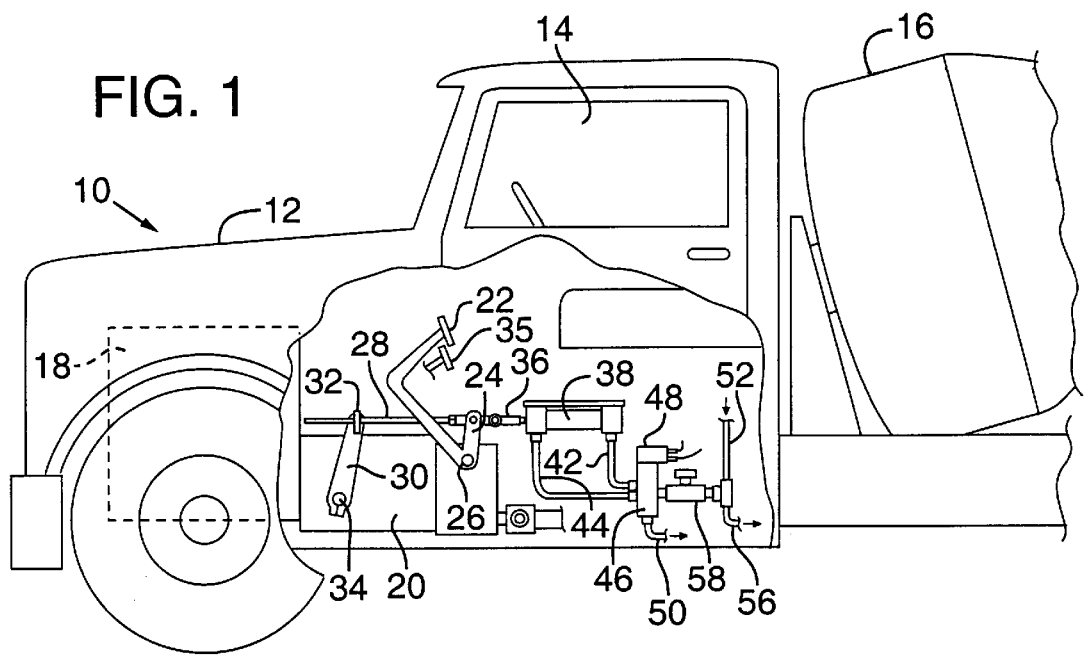
FIG. 1 is a side elevational view of a standard transmission concrete truck partially broken away to reveal one embodiment of a brake and clutch control system of the present invention.

FIG. 1 shows a standard transmission vehicle 10 that includes a front cab portion 12 having a passenger compartment 14. The illustrated standard transmission vehicle 10 is a concrete truck having a mixer 16 located at a rear portion of the vehicle, but the invention is equally applicable to other standard transmission vehicles, such as dump trucks and the like. At a front portion of the vehicle 10 is a suitable motor 18 coupled to a transmission 20 as is well understood in the art. The transmission 20 includes a clutch (not shown) that a driver operates using a clutch pedal 22 extending into the passenger compartment 14. Specifically, by pressing on the clutch pedal 22, a pedal-to-rod coupling 24 moves in a forward direction as the clutch pedal 22 rotates about a point 26. The pedal-to-rod coupling 24 is coupled to a clutch rod 28 so that forward movement of coupling 24 causes the clutch rod to move in a forward direction. The clutch rod 28 is coupled to a clutch arm 30 by an eyebolt 32 in the illustrated embodiment. When the clutch rod 28 moves in a forward direction, it rotates a clutch shaft 34 in a counterclockwise direction causing the clutch to disengage. Similarly, by releasing the clutch pedal 22, the clutch shaft 34 and clutch arm 30 rotate in a clockwise direction to engage the clutch.

Those skilled in the art will recognize that the illustrated connection between the clutch pedal 22 and the clutch can be accomplished in a number of ways, including using a combination of rocker arms. The particular structure illustrated in the figures for coupling the clutch pedal 22 to the clutch is not the only structure useful for coupling the two together and any desired structure may be used. The vehicle 10 also includes a brake pedal 35 and a gas pedal (not shown) located in the passenger compartment, as is well-known in the art.

Figure 2:
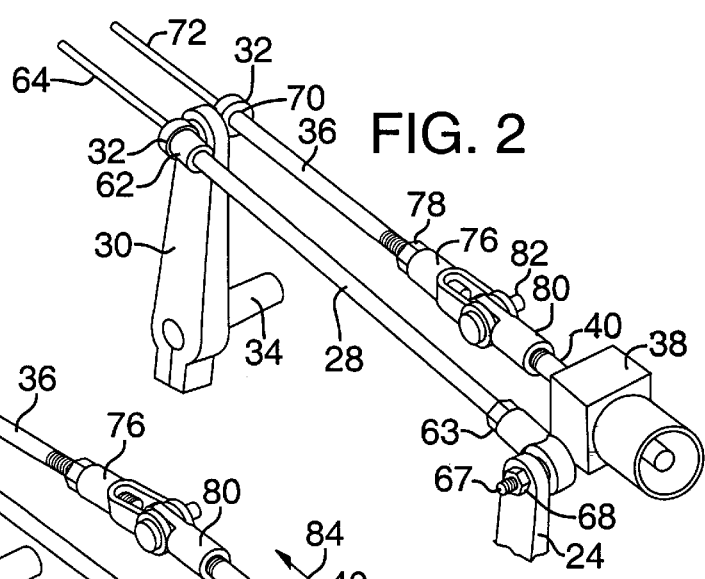
FIG. 2 shows a perspective view of a clutch arm coupled to a clutch rod (on left) and a brake rod and piston combination (on right) according to one embodiment of the invention with the clutch in an engaged position.

A brake rod 36 (only partially shown in FIG. 1) extends parallel to the clutch rod 28 and is also coupled to the clutch arm 30 by the eyebolt 32 (see FIG. 2). As further described below, the brake rod 36 is coupled to the brake pedal such that when the brake pedal is pressed, the brake rod 36 extends, pushing the clutch arm 30 and disengaging the clutch. When the brake is released, the brake rod 36 retracts and the clutch is engaged.

The brake rod 36 is coupled to a hydraulic cylinder 38. The illustrated hydraulic cylinder 38 is manufactured by Parker Hannifin Corporation, but a wide variety of cylinders may be used. The hydraulic cylinder 38 is mounted to vehicle 10 using a mounting plate (not shown) secured to a transmission cross member (not shown). As is well understood in the art, the hydraulic cylinder 38 has a piston rod 40 (see FIG. 2) extending therefrom that extends and retracts in response to the direction that hydraulic fluid is flowing through the cylinder. Two hydraulic lines 42, 44 are attached at one end to the hydraulic cylinder 38 and at an opposed end to a manifold 46. When fluid flows from the manifold 46 through the hydraulic line 42 to the hydraulic cylinder 38, the piston rod 40 extends from the hydraulic cylinder. Conversely, when fluid flows from the manifold 46 through hydraulic line 44, the piston rod 40 retracts. As further described below, the direction of hydraulic fluid through the manifold 46 is controlled by a solenoid 48. The solenoid 48, in turn, is controlled by and is responsive to the brake pedal 35 of the vehicle 10. A hydraulic fluid discharge line 50 is coupled to the manifold 46 and allows hydraulic fluid to flow back to a hydraulic tank (not shown). A hydraulic source line 52 is coupled to the hydraulic pump and provides hydraulic fluid to the manifold 46 via the T-coupling 54 (shown best in FIG. 5A) and provides fluid to the mixer 16 through hydraulic line 56. A pressure-reducing valve 58 is positioned between the manifold 46 and the T-coupling 54. The hydraulic fluid from the hydraulic pump is typically at a pressure of 3000 pounds. Such high pressures are not needed for the brake and clutch control system, so the pressure-reducing valve 58 reduces the pressure to a desired level. A rotatable knob 60 (see FIG. 5A) is positioned on top of the pressure reducing valve 58 and allows a driver to manually change the pressure of hydraulic fluid fed to the manifold 46. By changing the pressure of the hydraulic fluid, the driver can control the speed that the clutch is engaged and disengaged.

Figure 3:
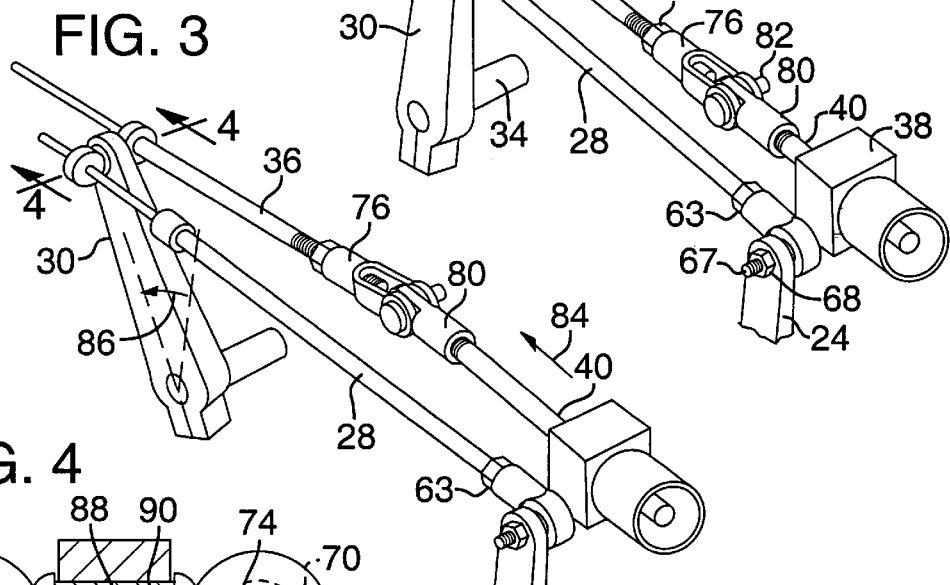
FIG. 3 shows the clutch arm of FIG. 2 rotating counterclockwise to disengage the clutch by movement of the piston and brake rod.

FIGS. 2 and 3 show the operation of the clutch rod 28 and brake rod 36 in more detail. FIG. 2 shows the clutch arm 30 in its at-rest (engaged) position when a driver is not pressing on either the brake pedal 35 or clutch pedal 22. The clutch rod 28 has a shoulder 62 for pressing against the eyebolt 32 and for securing a clutch rod extension 64 to the clutch rod 28. A lock nut 63 allows adjustment for controlling where the clutch rod 28 contacts the clutch arm 30. The clutch rod extension 64 extends through a centrally located hole 66 (FIG. 4) in the eyebolt 32. At an opposite end of the clutch rod 28 is a bolt 67 and nut 68 coupling the clutch rod 28 to the pedal-to-rod coupling 24.

The brake rod 36 also has a shoulder 70 pressing against the eyebolt 32 (most clearly shown in FIG. 4) with a brake rod extension 72 extending through hole 74 in the eyebolt. At an end of brake rod 36 opposite shoulder 70, a rod end 76 is threaded onto the brake rod 36. A jam nut 78 secures the brake rod 36 to the rod end 76 and allows for easy adjustment of the brake rod's length, which dictates where the shoulder 70 on the brake rod contacts the clutch arm 30. A threaded eyelet 80 is threaded onto the piston rod 40 opposite hydraulic cylinder 38. A bolt 82 secures rod end 76 to threaded eyelet 80 and allows some rotation of the brake rod 36 about bolt 82.

FIG. 3 shows the piston 40 moving in a direction shown by arrow 84 to disengage the clutch by rotating the clutch arm 30 counterclockwise as indicated by arrow 86. Specifically, the piston rod 40 of the hydraulic cylinder 38 extends in response to the pressing of the brake pedal 35, as is described further below. The extension of the piston 40, in turn, causes the brake rod 36 to push the clutch arm 30 causing the clutch to disengage. Notably, the clutch rod 28 does not move in response to movement of the brake rod 36. Instead, clutch rod extension 64 slides through hole 66 so that the clutch rod 28 can remain motionless. As a result, the clutch pedal 22 in the passenger compartment 14 also remains motionless. Rod end 76 rotates slightly with respect to the threaded eyelet 80 at the bolt and nut joint 82 to ease wear on the eyebolt 32. Although not shown, the clutch rod 28 can similarly move the clutch arm 30 when a driver presses on the clutch pedal 22 without effecting the position of the brake rod 36. Specifically, when the clutch rod 28 moves the clutch arm 30 causing rotation of the clutch arm in a direction shown at 86, the hole 74 (FIG. 4) in the eyebolt 32 allows the eyebolt to slide along the brake rod extension 72. Consequently, a driver may press the clutch pedal to disengage the clutch without causing corresponding movement in the brake pedal. In sum, both the brake and clutch pedals work independently to effectuate control of the clutch, but without effecting the operation of each other.

Figure 4:
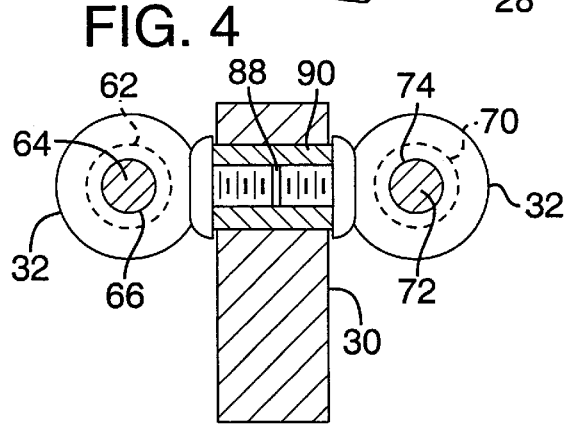
FIG. 4 shows a cross-sectional view of two eyebolts coupled to the clutch arm as seen through lines 4—4 of FIG. 3.

FIG. 4 shows a cross-sectional view of the eyebolts 32 coupled to the clutch arm 30 through lines 4—4 of FIG. 3. The clutch arm 30 has a threaded collar 88 extending therethrough allowing the eyebolts 32 to be threaded onto each side of the clutch arm 30. The collar 88 is positioned within a bushing 90 allowing the eyebolts 32 to rotate slightly, which reduces wear as the brake rod 36 and clutch rod 28 operate. The shoulders 62 and 70 are shown by dashed lines and are sized somewhat larger than the holes 66 and 74 in the eyebolts 32.

Figure 5A:
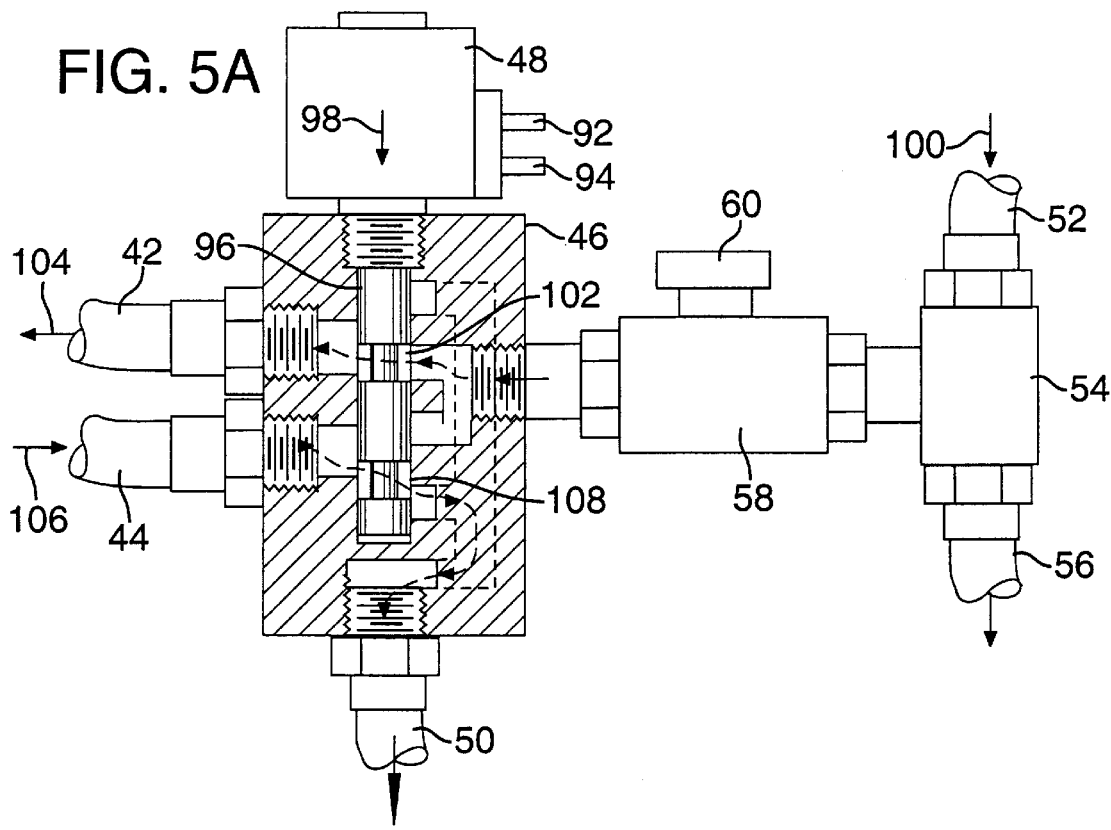
FIG. 5A shows a cross-sectional view of a manifold for controlling fluid flow to the piston according to the invention with fluid passing through the manifold in the illustrated embodiment to disengage the clutch.

FIG. 5A shows a cross-sectional view of the manifold 46 to illustrate the flow of fluid in response to activation of the solenoid 48. The illustrated solenoid 48 is an electromagnet, but other types of control devices may be used, as is well-known in the art. As described further below, the solenoid 48 has a positive wire 92 responsive to the operation of the brake pedal 35 and a neutral wire 94 coupled to the vehicle body (i.e., ground). When a driver presses the brake pedal, the solenoid 48 receives 12 volts of power on positive wire 92 causing a valve cartridge or rod 96 to move in the direction shown by arrow 98 to its illustrated position. Hydraulic fluid flows from the hydraulic pump (not shown) as indicated by arrow 100 into the T-coupling 54. The hydraulic fluid flows through the pressure reducing valve 58 through an opening 102 in the valve cartridge 96 allowing fluid to flow in the direction 104 in the hydraulic line 42. Such fluid motion causes the hydraulic cylinder 38 to extend the piston rod 40. Although not shown, the fluid flows through the hydraulic cylinder 38 and back to the manifold 46 in hydraulic line 44 as indicated at 106. Then the fluid flows through a second opening 108 in the cartridge 96 and discharges through discharge hose 50 back to the hydraulic tank.

Figure 5B:
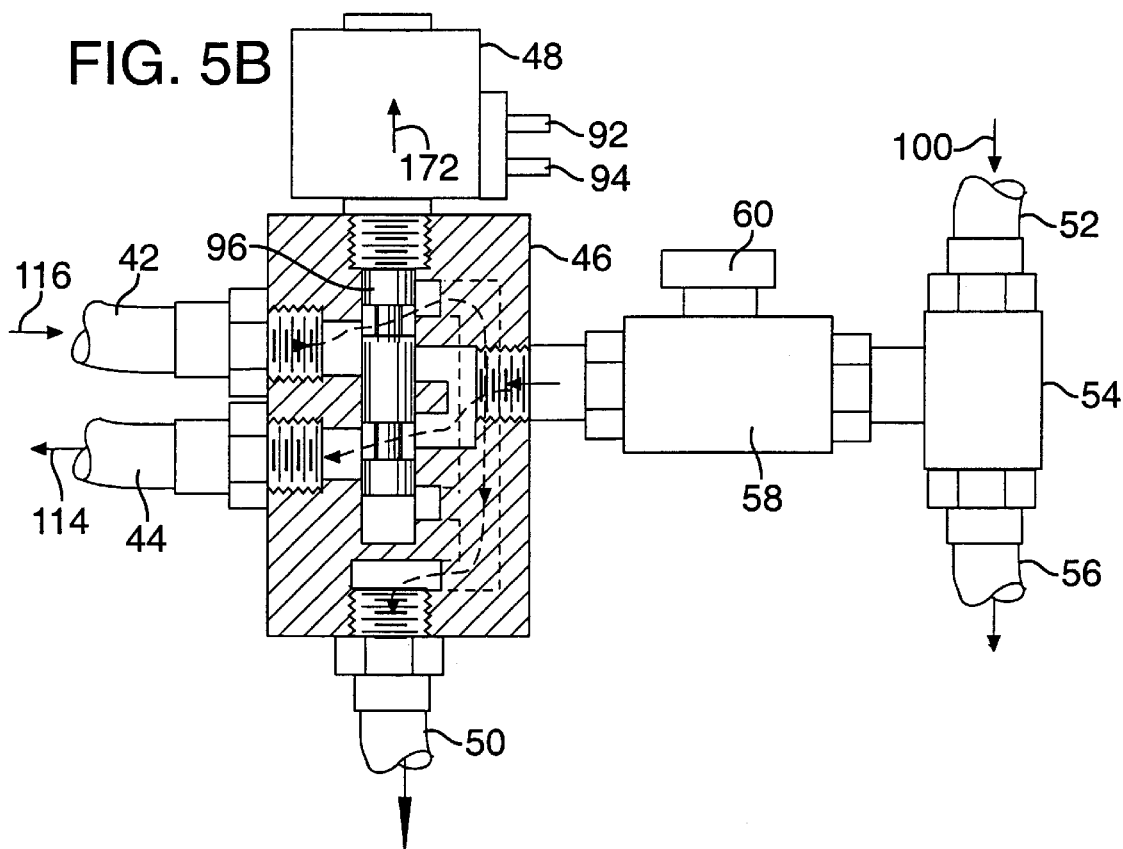
FIG. 5B shows a cross-sectional view of the manifold of FIG. 5A with fluid passing through the manifold in the illustrated embodiment to engage the clutch.

FIG. 5B shows the manifold in an at-rest position meaning the brake is released. As indicated at 112, at the moment the brake is released, the solenoid 48 causes cartridge 96 to move upward thereby redirecting the flow of fluid through the manifold 46. As indicated by arrow 114, fluid flows to the head of the hydraulic cylinder 38 causing the piston rod 40 to retract and consequently engaging the clutch. As indicated at 116, after the fluid passes through the hydraulic cylinder 38, it flows back into the manifold 46 through hose 42 and then through discharge hose 50 back to the hydraulic tank. As already indicated above, the pressure of fluid passing through the manifold is less than the fluid pressure in hose 52 from the hydraulic pump as a result of pressure reducing valve 58. The pressure of fluid through the manifold 46 is controlled by the rotatable knob 60, which allows a driver to change the speed of the hydraulic fluid to the manifold and, consequently, which controls the speed that the clutch is engaged or disengaged.

FIG. 6 shows an electrical diagram for the present invention. A vehicle battery 118 is used to supply voltage to the system. A positive terminal of the battery 119 is coupled to a brake light switch 120 at terminal 122. As indicated at 124, the brake light switch 120 is also coupled to the brake pedal. The switch 120 is responsive to the brake pedal 35 meaning it is activated when the brake pedal is pressed allowing 12 volts to pass from terminal 122 to an output terminal 126, as is well understood in the art. As a result of the activation of the brake light switch 120, the brake lights on the vehicle 10 are switched on. In addition, 12 volts passes to an ON/OFF switch 128 located in the passenger compartment 14 of the vehicle 10. The ON/OFF switch 128 is a safety device that either activates or deactivates the clutch and brake control system of the present invention. Thus, with the switch 128 in the ON position, the brake pedal 35 is coupled to the clutch such that pressing the brake pedal disengages the clutch and releasing the brake engages the clutch. Conversely, with the switch 128 in the OFF position, the brake pedal is uncoupled from the clutch so that the vehicle operates in a standard and well-known fashion. The ON/OFF switch 128 ensures that a driver does not have the combined brake and clutch system activated while driving at high speeds. With the switch 128 activated and with the brake light switch 120 activated, 12 volts passes to terminal 130 on an air pressure switch 132. Air pressure switches are well-known in concrete and dump trucks and are used as a safety device so that a driver can activate a special low gear in the vehicle 10. This special low gear (sometimes called "low low") is the lowest gear available on the vehicle and is typically used when the vehicle is dumping or loading material. As an extra safety precaution, the present invention taps into an airline of an existing (standard) air pressure switch (not shown) and adds a second air pressure switch 132 to detect at terminal 134 whether the driver pressed a low gear switch (located in the passenger compartment). When the driver presses the low gear switch, the air pressure switch 132 is activated allowing 12 volts to pass from the ON/OFF switch 128 to the positive terminal 92 on the solenoid 48 (see FIG. 5A).

In sum, the solenoid 48 is activated when the operator presses on the brake pedal 35, the ON/OFF switch is switched ON, and the vehicle is in a special low gear so that air pressure switch 132 is activated. Thus, when the operator presses on the brake, the solenoid 48 causes fluid to flow to the hydraulic cylinder 38 causing the piston rod 40 to extend thereby disengaging the clutch. When the operator releases the brake, the solenoid 48 is deactivated causing the piston rod 40 to retract and the clutch to be engaged. If the ON/OFF switch 128 is OFF or the air pressure switch 132 is OFF, then pressing and releasing the brake pedal has no effect on the clutch.

Having described and illustrated the principles of my invention with reference to an illustrated embodiment, it will be recognized that the illustrated embodiment can be modified in arrangement and detail without departing from such principles.

For example, although the invention was described as using hydraulics, other types of pressure systems may be used. For example, a pneumatic system may be used where the fluid is air or other gaseous material.

Additionally, one or more of the safety switches shown in FIG. 6 may be eliminated. Alternatively, additional switches may be used. Additionally, the particular type of switch used may change based on the particular type of vehicle. Any type of switch may be used.

Furthermore, although a single manifold is shown, the invention may include two manifolds separately controlled by two solenoids, each controlling a direction of movement of the piston in the cylinder.

Still further, although a constant pressure system is shown with fluid always flowing through the hydraulic cylinder in one direction or another, the system may instead only provide fluid pressure to the cylinder when the manifold is activated.

Still yet further, although eyebolts are shown to slidably connect the rods to the clutch arm, other connectors well-known in the art may be used.

Still further, although an air pressure switch is shown for detecting whether the vehicle is in a special low gear, other techniques may be used. For example, some trucks use a shift lever, rather than using an airline. In such a case, an electric arm switch or other type of switch may be used to detect that the vehicle is in the special low gear.

In view of the many possible embodiments to which the principles of my invention may be applied, it should be recognized that the detailed embodiments are illustrative only and should not be taken as limiting the scope of my invention. Rather, I claim as my invention all such embodiments as may come within the scope of the following claims and equivalents thereto.

I claim:

1. A method of controlling a clutch in a standard transmission vehicle, comprising:

provipting clutch and brake pedals within a passenger compartment of the vehicle;

engaging the clutch in response to releasing the clutch pedal and disengaging the clutch in response to pressing the clutch pedal;

engaging the clutch in response to releasing the brake pedal and disengaging the clutch in response to pressing the brake pedal;

providing a clutch arm coupled to the clutch and providing a first rod coupled to the brake pedal and slidably coupled to the clutch arm; and providing a second rod coupled to the clutch pedal and slidably coupled to the clutch arm.

2. The method of claim 1 wherein the clutch and brake pedals engage and disengage the clutch independently of each other so that pressing or releasing one does not effect normal operation of the other.

3. The method of claim 1 wherein the vehicle further includes brakes and the method further includes engaging the brakes and simultaneously disengaging the clutch in response to pressing the brake pedal.

4. The method of claim 1 wherein the vehicle is a truck that includes a gas pedal, the brake pedal, and the clutch pedal located within a passenger compartment of the vehicle.

5. The method of claim 1 further including providing a piston coupled to the brake pedal for disengaging the clutch in response to pressing the brake pedal.

6. The method of claim 5 wherein the piston is controlled by hydraulic pressure.

7. The method of claim 5 wherein the piston is controlled pneumatically.

8. The method of claim 5 including providing at least one manifold having fluid flowing therethrough for controlling the piston, wherein the direction of the fluid flowing through the at least one manifold changes in response to pressing and releasing of the brake pedal.

9. The method of claim 8 further including coupling a solenoid to the brake pedal and to the manifold for controlling the direction of fluid flowing through the manifold.

10. The method of claim 1 further including providing an ON/OFF switch located in the passenger compartment of the vehicle, wherein with the ON/OFF switch in the OFF position pressing the brake pedal has no effect on the clutch and with the ON/OFF switch in the ON position movement of the brake pedal controls the clutch.

11. The method of claim 1 further including providing an air pressure switch for detecting the engagement or disengagement of a low gear in the vehicle and wherein with the air pressure switch activated, the brake pedal is coupled to the clutch for controlling the clutch in response to pressing and releasing of the brake pedal, and with the air pressure switch deactivated, the brake pedal is uncoupled from the clutch such that pressing and releasing the brake pedal has no effect on the clutch.

12. An apparatus for controlling a clutch using a brake pedal in a standard transmission vehicle, wherein the vehicle also includes a clutch pedal for controlling the clutch, comprising:

a piston coupled between the brake pedal and the clutch such that pressing the brake pedal causes the piston to disengage the clutch and releasing the brake pedal causes the piston to engage the clutch; and a clutch arm coupled to the clutch, the clutch arm having a first position wherein the clutch is engaged and a second position wherein the clutch is disengaged and further including a rod coupled at one end to the piston and at an opposed end slidably coupled to the clutch arm so that the clutch arm can move to the second position when the clutch is disengaged without moving the rod or the piston.

13. The apparatus of claim 12 wherein the piston is controlled pneumatically.

14. The apparatus of claim 12 wherein the piston is controlled by hydraulics.

15. The apparatus of claim 12 further including an ON/OFF switch located in a passenger compartment of the vehicle, the ON/OFF switch coupled to the piston such that with the ON/OFF switch in the ON position, the piston moves in response to movement of the brake pedal and with the ON/OFF switch in the OFF position, the piston does not move in response to the brake pedal.

16. The apparatus of claim 12 further including an air pressure switch controllable from a passenger compartment of the vehicle, the air pressure switch placing the vehicle in a special low gear when activated, and wherein the piston moves in response to movement of the brake pedal when the air pressure switch is activated, and with the air pressure switch deactivated, the piston does not move in response to the brake pedal.

17. An apparatus for controlling a clutch using a brake pedal in a vehicle, wherein the vehicle also includes a clutch pedal for controlling the clutch, comprising:

a clutch arm coupled to the vehicle clutch, wherein the clutch arm has a first position wherein the clutch is engaged and a second position wherein the clutch is disengaged;

a piston coupled to the clutch arm for moving the clutch arm to disengage and engage the clutch;

a manifold coupled to the piston, the manifold providing fluid to the piston for extending the piston to disengage the clutch when the fluid flows in a first direction and for retracting the piston to engage the clutch when the fluid flows in a second direction;

a solenoid coupled to the manifold for controlling the direction of fluid flow through the manifold; and the solenoid being responsive to the brake pedal such that pressing the brake pedal in the vehicle causes the solenoid to control the fluid in the manifold to flow in the first direction to disengage the clutch and releasing the brake pedal in the vehicle causes the solenoid control the fluid in the manifold to flow in the second direction to engage the clutch.

18. A method of controlling a clutch in a standard transmission vehicle, comprising:

providing clutch and brake pedals within a passenger compartment of the vehicle;

engaging the clutch in response to releasing the clutch pedal and disengaging the clutch in response to pressing the clutch pedal;

engaging the clutch in response to releasing the brake pedal and disengaging the clutch in response to pressing the brake pedal;

providing a piston coupled to the brake pedal for disengaging the clutch in response to pressing the brake pedal;

providing at least one manifold having fluid flowing therethrough for controlling the piston, wherein the direction of the fluid flowing through the at least one manifold changes in response to pressing and releasing of the brake pedal; and coupling a solenoid to the brake pedal and to the manifold for controlling the direction of fluid flowing through the manifold.

19. The method of claim 18 wherein the clutch and brake pedals engage and disengage the clutch independently of each other so that pressing or releasing one does not effect normal operation of the other.

20. The method of claim 18 further including providing an ON/OFF switch located in the passenger compartment of the vehicle, wherein with the ON/OFF switch in the OFF position pressing the brake pedal has no effect on the clutch and with the ON/OFF switch in the ON position movement of the brake pedal controls the clutch.

21. The method of claim 18 further including providing an air pressure switch for detecting the engagement or disengagement of a low gear in the vehicle and wherein with the air pressure switch activated, the brake pedal is coupled to the clutch for controlling the clutch in response to pressing and releasing of the brake pedal, and with the air pressure switch deactivated, the brake pedal is uncoupled from the clutch such that pressing and releasing the brake pedal has no effect on the clutch.

22. A method of controlling a clutch in a standard transmission vehicle, comprising:

providing clutch and brake pedals within a passenger compartment of the vehicle;

engaging the clutch in response to releasing the clutch pedal and disengaging the clutch in response to pressing the clutch pedal;

engaging the clutch in response to releasing the brake pedal and disengaging the clutch in response to pressing the brake pedal; and providing an air pressure switch for detecting the engagement or disengagement of a low gear in the vehicle and wherein with the air pressure switch activated, the brake pedal is coupled to the clutch for controlling the clutch in response to pressing and releasing the brake pedal, and with the air pressure switch deactivated, the brake pedal is uncoupled from the clutch such that pressing and releasing the brake pedal has no effect on the clutch.

23. The method of claim 22 wherein the clutch and brake pedals engage and disengage the clutch independently of each other so that pressing or releasing one does not effect normal operation of the other.

24. The method of claim 22 wherein the vehicle further includes brakes and the method further includes engaging the brakes and simultaneously disengaging the clutch in response to pressing the brake pedal.

25. The method of claim 22 further including providing a clutch arm coupled to the clutch and providing a first rod coupled to the brake pedal and slidably coupled to the clutch arm.

26. An apparatus for controlling a clutch using a brake pedal in a standard transmission vehicle, wherein the vehicle also includes a clutch pedal for controlling the clutch, comprising:

a piston coupled between the brake pedal and the clutch such that pressing the brake pedal causes the piston to disengage the clutch and releasing the brake pedal causes the piston to engage the clutch; and an air pressure switch controllable from a passenger compartment of the vehicle, the air pressure switch placing the vehicle in a special low gear when activated, and wherein the piston moves in response to movement of the brake pedal when the air pressure switch is activated, and with the air pressure switch deactivated, the piston does not move in response to the brake pedal.

27. The method of claim 26 wherein the clutch and brake pedals engage and disengage the clutch independently of each other so that pressing or releasing one does not effect normal operation of the other.

28. The method of claim 26 wherein the vehicle further includes brakes and the method further includes engaging the brakes and simultaneously disengaging the clutch in response to pressing the brake pedal.

29. The method of claim 26 further including providing a clutch arm coupled to the clutch and providing a first rod coupled to the brake pedal and slidably coupled to the clutch arm.

30. An apparatus for controlling a clutch using a brake pedal in a standard transmission vehicle, wherein the vehicle also includes a clutch pedal for controlling the clutch, comprising:

a piston coupled between the brake pedal and the clutch such that pressing the brake pedal causes the piston to disengage the clutch and releasing the brake pedal causes the piston to engage the clutch; and an electric arm switch that detects the engagement or disengagement of a low gear in the vehicle and with the electric arm switch activated, the brake pedal is coupled to the clutch for controlling the clutch in response to pressing and releasing the brake pedal, and with the electric arm switch deactivated, the brake pedal is uncoupled from the clutch such that pressing and releasing the brake pedal has no effect on the clutch.

31. The method of claim 30 wherein the clutch and brake pedals engage and disengage the clutch independently of each other so that pressing or releasing one does not effect normal operation of the other.

32. The method of claim 30 wherein the vehicle further includes brakes and the method further includes engaging the brakes and simultaneously disengaging the clutch in response to pressing the brake pedal.

33. The method of claim 30 further including providing a clutch arm coupled to the clutch and providing a first rod coupled to the brake pedal and slidably coupled to the clutch arm.

\* \* \* \* \*